E. I. DYER & A. R. HEISE.
METHOD FOR SEPARATING MIXTURES OF LIQUIDS.
APPLICATION FILED JUNE 15, 1914.

1,242,784.

Patented Oct. 9, 1917.
2 SHEETS—SHEET 1.

WITNESSES:

INVENTORS
E. I. Dyer
A. R. Heise
BY
ATTORNEYS

E. I. DYER & A. R. HEISE.
METHOD FOR SEPARATING MIXTURES OF LIQUIDS.
APPLICATION FILED JUNE 15, 1914.

1,242,784.

Patented Oct. 9, 1917.
2 SHEETS—SHEET 2.

WITNESSES:

INVENTORS

ATTORNEYS

UNITED STATES PATENT OFFICE.

ERNEST I. DYER, OF OAKLAND, AND ARTHUR R. HEISE, OF AVILA, CALIFORNIA.

METHOD FOR SEPARATING MIXTURES OF LIQUIDS.

1,242,784.  Specification of Letters Patent.  Patented Oct. 9, 1917.

Application filed June 15, 1914. Serial No. 845,060.

*To all whom it may concern:*

Be it known that we, ERNEST I. DYER and ARTHUR R. HEISE, citizens of the United States, residing the said DYER at Oakland, in the county of Alameda and State of California, and the said HEISE at Avila, county of San Luis Obispo, California, have invented certain new and useful Improvements in Methods for Separating Mixtures of Liquids, of which the following is a specification.

This invention relates to the art of separating mechanical mixtures of liquids such as emulsions of oil and water, and particularly to those peculiarly stable and refractory emulsions which occur in connection with the asphaltic petroleums of California. While the process hereinafter described is applicable to the treatment of hydrocarbon oils in general, it is more especially designed for the treatment of petroleum emulsions of the type mentioned, and in the following description of our process, for the sake of clearness, its adaptation to such oils will be explained, but it must be understood that we do not limit ourselves to this application alone.

The asphaltic crude oils of California are especially liable to carry water in the form of an emulsion which cannot be readily and economically separated from the oil by settling, moderate heating, blowing with air or by the application of the other well known means usually resorted to for such purposes. Several methods have been developed which are suitable for use under proper conditions, but as far as we know, none as yet has been developed which possesses such characteristics as render it suitable for use under a great variety of adverse circumstances.

It has been recognized for some time, in connection with the oil industry, that it would be highly desirable to develop a simple, economical and safe method for breaking down these refractory emulsions by mechanical means alone. It is well known that the water is contained in the oil in the form of small globules, many of which are so small as to be invisible except under the microscope. These globules behave as if they were inclosed by an exceedingly tough protecting skin, which resists rupture with great tenacity. In some cases their form may be accounted for by well known capillary effects due to the surface tension existing between the interfaces of non-miscible liquids; in others, laboratory experiments tend to show that the globules of water are actually surrounded by a tenacious envelop composed largely of substances of greater specific gravity than the mean specific gravity of the oil itself. It may be composed of heavy asphaltic substances derived from the oil, such as so called asphaltenes or of any other substances present in the oil whether or not of origin foreign to that of the oil itself. Whatever the composition of this envelop may be or whether it may be only a capillary film of the water or of the oil or both, we have discovered that the water cannot be completely separated from the oil without destruction of this envelop or interfacial capillary film or films. Centrifugal devices have succeeded to a certain extent in eliminating some of the water, but their lack of effectiveness has been such that their application has never been extensive. Electrical methods have been developed which depended for their action on imparting electrical charges to the suspended particles, causing them to coalesce, but these methods have not as yet found great favor in the oil fields.

The present method for the successful treatment of the petroleum emulsion for breaking down the envelop, whether it be an actual physical membrane made up of substances of composition different from the oil itself or derived from the oil, or merely a film either of oil or of water, is to subject the flowing body of oil under treatment to such pressures as to force the oil through a multiplicity of minute or capillary passages of such dimensions that distortion of the form of the globule with subsequent rupture of its skin necessarily results. This change of form tends to destroy the equilibrium in the case of capillary films due to surface tension and in the case of actual physical envelops as above described, to set up both tangential and radial stresses such that in either case rupture will ensue; and inasmuch as such rupture will then take place in a space of capillary dimensions all such rupturing globules will be within such a short distance of each other as to enable the cohesive or capillary forces to cause their contents to agglomerate or coalesce.

We take advantage of the known fact that of all forms which matter assumes, the sphere has the largest volume for the least extent of surface and this is the form assumed by particles of one liquid suspended freely in another when in a state of equilibrium. In order, therefore, to destroy the equilibrium of the envelop, it becomes necessary to change the form of the globule, for by so changing the form the extent of surface necessary to inclose a given mass is increased and stresses are set up in the envelop or capillary film tending to destroy the equilibrium, and if a time limit is introduced such that the change of form takes place during a period so short as to make it ir possible for the film to stretch or readjust itself to the new form by migrations of particles from other portions of the film, the film will break and as the disruption occurs in the presence of and within capillary reach of other and similar particles, coalescence of their contents will result.

In the case of dense emulsions where the particles, originally spherical in form, are in contact, the figure assumed by them is polyhedral in a state of equilibrium. These polyhedra being forced into a capillary passage are subjected to unsymmetrical forces through friction, impact, capillary action or other causes with attendant destruction of their envelops, the result being the same as in the case of the freely suspended spheres and for the same causes.

Oil and water flow through small openings with different degrees of freedom, whether the effect be caused by capillary action, frictional resistance, the viscosity of the liquid itself or other causes. As a consequence, in forcing a mixture of oil and water through a very small opening, the tendency is for the two components of the mixture to move at different velocities, so that certain portions of the stream may become relatively rich in water and others rich in oil. This tendency facilitates the separation of the two liquids after rupture of the envelops in the case of emulsions and at the same time tends to prevent their reëmulsification.

By practical experiments, as we have proven, emulsions of water and oil can be permanently broken down in the manner described and the water contained in the disrupted globules completely separated from the oil.

The flowing body of emulsion to be treated is forced through a multiplicity of capillary passages of a capillary medium, which medium may be provided in a great many ways. For example, we may use a closely woven cloth, any material of a porous character, a mass of finely divided mineral matter such as infusorial earth; in fact, any body or combination of bodies through which pass openings of capillary character. The emulsion may be caused to pass through the capillary body either by means of a pump, elevated tank or other suitable pressure-developing device on the inlet side or by a vacuum pump, siphon or other suitable device for deriving pressures lower than atmospheric on the outlet side. Under certain conditions there may be employed any combination of any of the above means for creating a difference in pressure between inlet and outlet sides of the capillary substance.

We have found in carrying out our method that inasmuch as surface tension is decreased by elevation of temperature, the emulsion may be broken down with greater ease by a heating of the same prior to a forcing thereof under pressure through the capillary medium for breaking down the globules to free or liberate the water therein, and further that through the same cause the tendency for reëmulsification of the treated emulsion is minimized, inasmuch as the ability of the water to form an emulsion with the oil is diminished due to the lessened surface tension caused by the increase of temperature. Therefore, while we give preference to the raising of the temperature of the emulsion for treatment prior to forcing the same under pressure through the capillary medium, we do not wish to be understood as so restricting the invention.

Any suitable form of an apparatus may be employed for carrying out the invention, the one illustrated in the accompanying drawings disclosing a simple and efficient apparatus for this purpose, and wherein—

Figure 1:
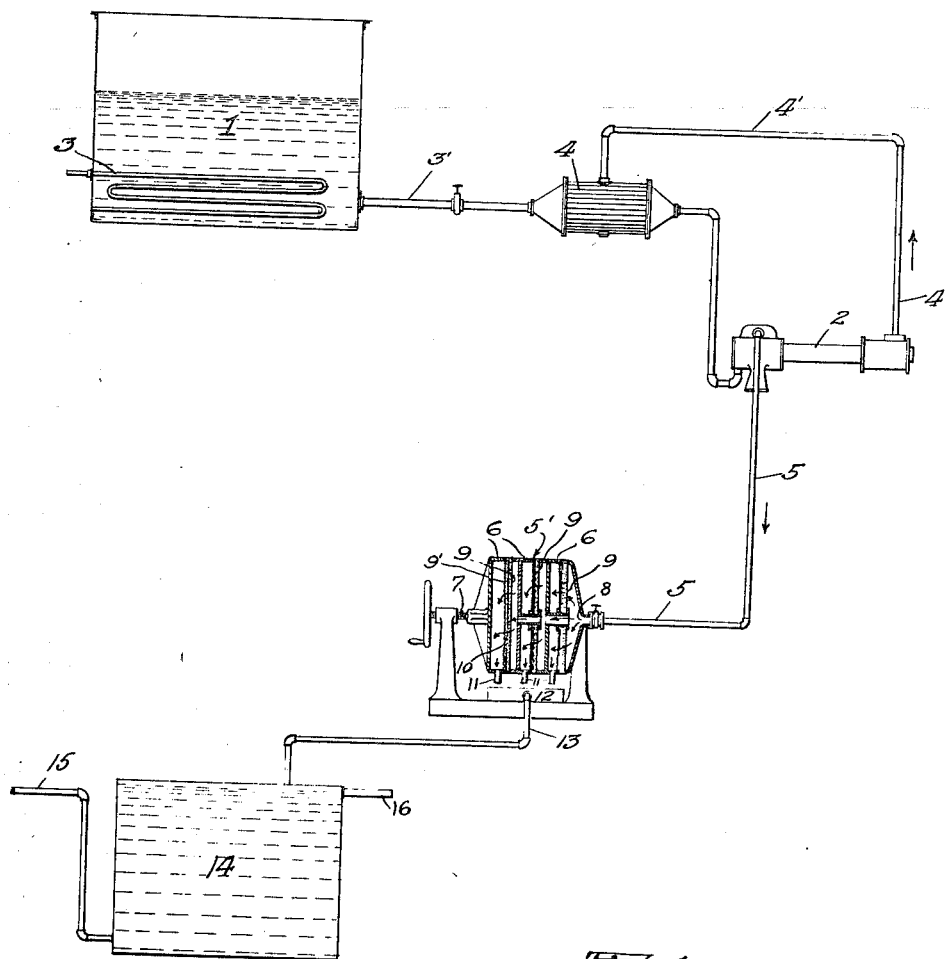
Figure 1 is a diagrammatic view in elevation of an apparatus for heating the emulsion for treatment and forcing the same through a connected system of capillary mediums for breaking down or destroying the globules for liberation of the water contained therein.
Figure 2:
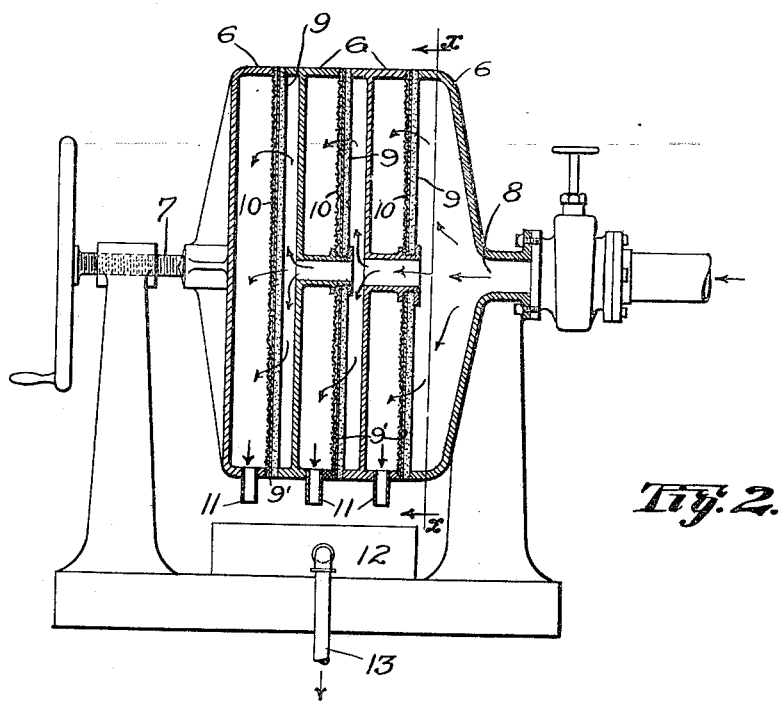
Fig. 2 is an enlarged detail sectional view disclosing a system of connected capillary mediums.
Figure 3:
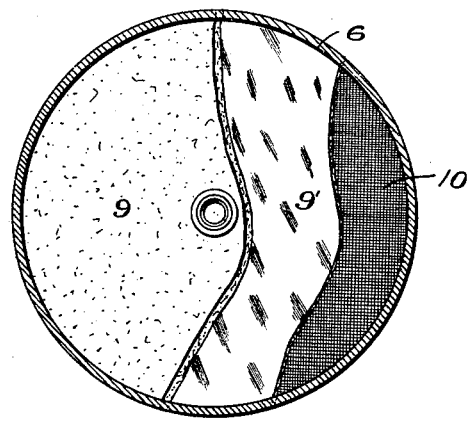
Fig. 3 is a sectional plan view taken on line $x$—$x$—Fig. 2 of the drawings.

In the drawings, the numeral 1 is used to designate any suitably constructed or receiving reservoir for the emulsified oil to be treated, which tank may be elevated at a height above the capillary medium, sufficient to give the desired pressure for forcing the emulsion of oil through the said capillary medium, but preference is given to the employment of a pump 2. Tank 1 is shown equipped with a steam coil 3, which may be used to decrease the viscosity of the oil and cause a certain amount of the free water contained in the emulsion to precipitate out under favorable conditions, and at the same time enable the oil to flow through the inter-connecting piping 3′ with greater facility. The emulsion flowing through the piping 3' is conveyed to a heater 4 of ordinary construction, so arranged as to heat the emulsified oil, in the case of the example shown, by means of the exhaust steam from the pump 2 delivered thereto by the connecting pipe 4'. This heater may be used independently of coil 3 or in conjunction with it, and may be also furnished with live steam or any other suitable heating medium. From the pump 2 the emulsified oil is forced through a connection 5 to any suitably constructed form of a capillary separator 5'. In this illustration of the separator is disclosed a diagrammatic representation of an apparatus resembling a filter press of conventional form and construction. As this form of apparatus is well understood a detailed description will not be necessary. In general it will be seen to consist of a series of frames 6, clamped together by means of a screw 7, in such a way that the emulsified oil flowing from the connection 5 is caused to enter by opening 8, following the course indicated by the arrows. During its passage through the apparatus it is forced under pressure through the interstices of the capillary mediums, each consisting of a layer cake 9 of mineral material, such as infusorial earth on the outer surface of a cloth 9', which is backed by a screen or perforated plate 10, which plate serves to reinforce the cloth and prevent its tearing and at the same time affords a relatively free opening through it. After passing through the capillary medium or mediums, the oil with its water particles or contents freed or liberated from its inclosing envelop, passes out through the openings 11, into the trough 12, and through the pipe 13, to a suitable place of deposit, such as the tank 14. This tank 14 is equipped with suitable outlets so that the water which precipitates out almost immediately may be drained off independently of the oil from time to time, through the outlet pipe 15, connected with the bottom of the tank, while the oil rising within the tank 14 escapes therefrom through the overflow outlet pipe 16, connected near the top of the said tank, as shown. With this arrangement the dried oil will flow continuously out of the discharge outlet 16, to a suitable place of deposit and the water discharge through the pipe 15. The capacity of the capillary separator may be increased to any desired extent by either increasing the surface area of the filtering mediums, or increasing the connected number thereof.

By an extended series of experiments with the most refractory emulsions with which we have had experience, taken from the Santa Maria oil fields in California, we have been able to effect almost complete separation of the water content with an apparatus of the type illustrated. On applying to the receiving or outer surface of the cloth 9' a layer or cake of diatomaceous earth in a finely divided state, we have found that under some conditions the effectiveness of the operation is increased, so that by careful tests we have been able to remove substantially all of the emulsified water content in the manner described.

The method herein described for separating mixtures of liquid must not be treated as a process filtering operation, for such is not the case. In filtration, the object is to remove a solid or more or less solid substance from a liquid, and the substances are separated by the intervention of a porous substance which is impervious to one of them so that during the filtering operation one substance passes on, leaving the other behind and deposited on the filtering medium. Under the present invention, the primary object is to separate two liquids, especially an oil and water emulsion. Both of these substances pass together through the porous or capillary medium, which in this case acts not as a filter or strainer, but as a device for breaking down or destroying the globular particles of the emulsion as described, in order to free or liberate the water confined therein, no separation of the liberated water from the oil taking place until the capillary or porous medium has been entirely and practically simultaneously traversed by both liquids and the two brought to a state of rest or of motion at relatively low velocity out of contact with the porous or capillary medium. In the case of such oils as may be wet or emulsified, due to the presence of minute solids or mineral matter or other foreign substances in a finely divided state, forming a nucleus about which water tends to gather or be absorbed, the operation may be facilitated by retaining such substances on the capillary medium, these substances tending to take the place of the diatomaceous earth described above. In this case the mineral matter may act as a positive aid to separation, and with such oils the removal of these foreign substances is purely incidental to the primary function of the process, so that such filtering action as may occur is of secondary consideration, although the removal of these particles, in so far as the presence of water may depend upon them, will tend to prevent reëmulsification.

Owing to the extreme simplicity of the apparatus necessary to apply our process and the moderate pressures which we have found are required to force the oil through the capillary openings of the mediums thereof, the cost of construction thereof and of the treatment of the emulsified oil is low, and, as a consequence, the described process will appeal to and prove extremely valuable to the small producers of oil who cannot sell their product if it contains an undue quantity of moisture. In many cases it will be possible to carry out the method in connection with the oil flowing through pipe lines already existing, so that the oil may be deprived of its emulsified water content in transit from the fields to point of use. At places where oil is used as fuel, and may become contaminated with water during transport by vessel, the process furnishes a ready and inexpensive means of overcoming the difficulties which have heretofore existed. On board ship, in power plants and in connection with other industrial operations using oil fuel where for some cause or other a supply of wet oil may have been received through inadvertence, this process enables the water to be removed continuously during ordinary every-day operation. The water removed carries with it such salts as may be in solution, rendering the oil suitable for use in refineries without destructive effects on stills and other apparatus. At the same time it eliminates trouble in furnaces and oil burners due to clogging through precipitation of salts and in such industrial processes as require heat to be derived from a hydrocarbon uncontaminated with such salts, it provides suitable relief. In the removal of water from valuable refining oils the process may be conducted in a closed cycle thereby preventing losses by evaporation which are now incidental to all other methods with which we are as yet familiar. As the operation is conducted under relatively low pressure and at temperatures but slightly exceeding the normal and without the application of electricity at high potential, all danger to life and property is obviated.

Having thus described the invention what we claim as new and desire to secure protection by Letters Patent is:—

1. The method of separating water from emulsified mineral oils, which consists in breaking down the shell of the water enveloping globules to liberate the confined water by forcibly ejecting the body of oil through a capillary medium.

2. The method of separating particles of water from emulsified mineral oils which consists in simultaneously passing both components through a capillary medium under pressure to break down the inclosing film of the globules of one liquid to free the other liquid therefrom.

3. The method of separating water from emulsified mineral oils which consist in liberating the water by breaking down or puncturing under pressure the inclosing shell of the globules within which the water is confined.

4. The method of freeing and separating water from emulsified mineral oils, which consists in breaking or puncturing the covering film of the water confining globules by forcibly passing a body of flowing emulsified mineral oil through a capillary medium, and thence overflowing the oil from the water.

5. The method of freeing and separating water from emulsified mineral oils, which consists in first raising the temperature of the body of oil to be treated, and thence breaking down the film of the water confining globules by forcibly ejecting the said oil through a capillary medium.

6. The method of separating water from emulsified mineral oils, which consists in liberating the water by forcibly ejecting the oil through a capillary medium to break down the water confining globules, thence conveying the water and oil to a place of deposit, thence withdrawing the oil and water as separated streams of liquid.

7. The method of separating water from emulsified mineral oils, the step of which resides in breaking down the confining wall of the water containing globules of the emulsified oil by passing the oil in a stream flow under pressure through a capillary medium.

8. The method of separating and collecting particles of one liquid suspended in another, which consists in subjecting the liquid to pressure and under such pressure breaking down the inclosing film for the internal phase of the mixture to be freed by forcibly passing the same through a capillary member, causing the released internal phase of the mixture to coalesce, leading the separated liquids to a place of deposit, and withdrawing one from the other.

9. The method of freeing and collecting particles of one liquid suspended in another, which consists in forcibly ejecting the mixture through a capillary medium to break down the inclosing film for the internal phase of the mixture, causing the internal and external phases of the mixture to coalesce separately beyond the capillary medium through which the mixture is forced, and thence leading the separated liquids to a place of deposit.

10. In the herein described method of treating oily materials containing mineral oil and impurities insoluble therein, the step which comprises passing said oily materials first through small perforations in a member and thereafter through perforations in a separate member, said two members being spaced from each other, and then allowing said oily materials to separate by differences in the specific gravities of said mineral oil fraction and the fraction constituting said impurities.

11. A method of treating oily materials containing emulsified impurities not readily separable by gravity, which comprises passing said oily materials successively through a plurality of foraminous members, spaced from each other, the perforations in at least one of said members having at least one extremely small dimension, and thereafter allowing said oily materials to separate by differences in the specific gravities of its constituents.

In testimony whereof we have signed our names to this specification in the presence of two subscribing witnesses.

ERNEST I. DYER.
ARTHUR R. HEISE.

Witnesses:
N. A. ACKER,
D. B. RICHARDS.